United States Patent [19]

Watanabe et al.

[11] 4,276,560

[45] Jun. 30, 1981

[54] COLOR SIGNAL REPRODUCING SYSTEM AND CIRCUIT FOR THE SAME

[75] Inventors: Yasuaki Watanabe, Kasukabe; Yukio Okabe, Noda; Shinichi Kojima, Higashimurayama; Mitsuya Sato, Kokubunji, all of Japan

[73] Assignees: Hitachi, Ltd.; Victor Company of Japan, Limited, both of Tokyo, Japan

[21] Appl. No.: 964,337

[22] Filed: Nov. 28, 1978

[30] Foreign Application Priority Data

Nov. 28, 1977 [JP] Japan .................................. 52-141642

[51] Int. Cl.³ ............................................. H04N 9/535
[52] U.S. Cl. .................................. 358/28; 358/21 V; 358/27
[58] Field of Search ....................... 358/21 V, 27, 28

[56] References Cited

U.S. PATENT DOCUMENTS 3,950,780  4/1976  Freestone ............................... 358/28
4,130,831  12/1978  Isono et al. ......................... 358/21 V

OTHER PUBLICATIONS

"A Flesh-Tone Correction Circuit", Roy Ekstrano, IEEE Trans Broadcast & Telev. Recv., vol. BTR-17 No. 3, Aug. 1971.

Primary Examiner—Richard Murray
Attorney, Agent, or Firm—Craig & Antonelli

[57] ABSTRACT

In a color signal reproducing circuit, a red color difference signal from a color demodulator circuit is corrected by a blue color difference signal, and the blue color difference signal is corrected by a luminance signal. The phase of a color subcarrier signal to be supplied to the color demodulator circuit is controlled by the corrected red color difference signal during reception of a VIR signal, and the level of a color signal to be supplied to the color demodulator circuit is controlled by the corrected blue color difference signal. The controls of hue and color saturation are facilitated by the use of the corrected color difference signals. It is also made possible to deliver from the color demodulator circuit, color difference signals which match the fluorescence characteristics of a color picture tube.

28 Claims, 12 Drawing Figures

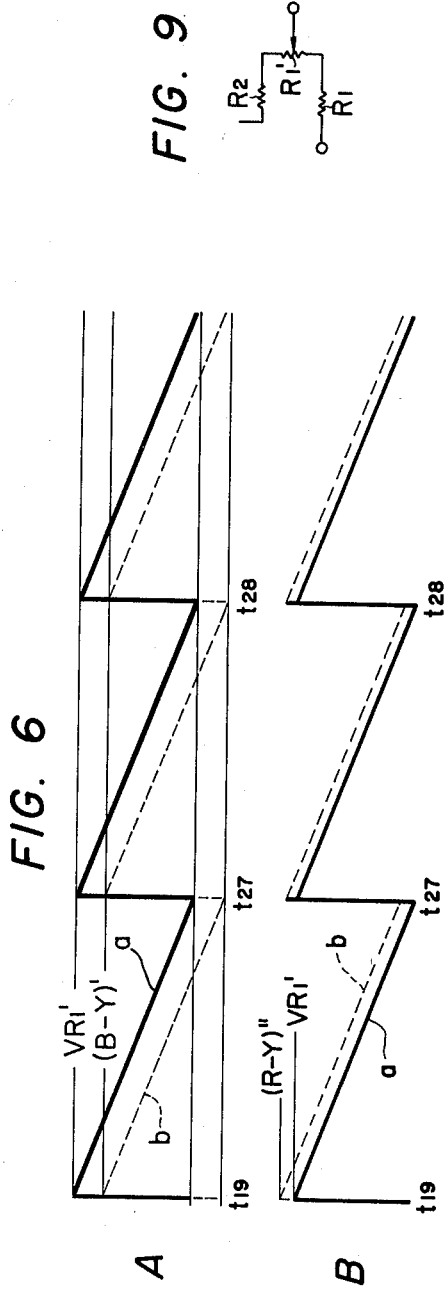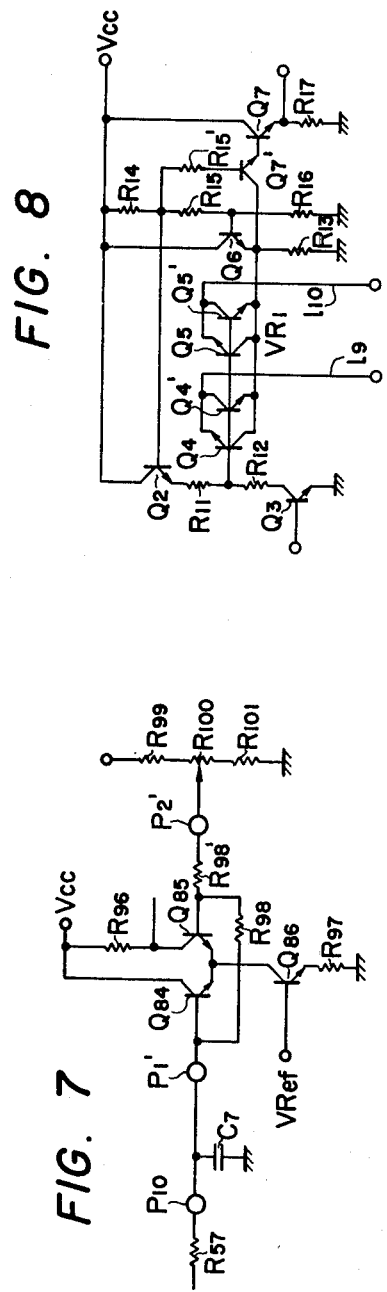

COLOR SIGNAL REPRODUCING SYSTEM AND CIRCUIT FOR THE SAME

BACKGROUND OF THE INVENTION

This invention relates to a color signal reproducing system. More particularly, it relates to a color signal reproducing system wherein the hue and the saturation are controlled on the basis of a vertical interval reference signal (hereinbelow, termed "VIR signal") broadcast and received, and a circuit for the system.

In color broadcast reception, the idea of controlling the hue and color saturation of a reproduced picture by exploiting a VIR signal inserted in the video detection signal of a vertical flyback time has been known from, for example, the official gazette of Japanese Patent Laying Open Print No. 51-46830.

In a known color signal reproducing circuit which utilizes the VIR signal, a color difference signal from a color demodulator circuit which receives a chroma signal and a color subcarrier signal or a color signal from a color tube driver circuit which receives a luminance signal and a color difference signal from a color demodulator circuit is detected during the reception of the VIR signal, and the level of the chroma signal or the phase of the color subcarrier is controlled by the detected output.

With such a known color signal reproducing circuit, however, the signal from the color demodulator circuit or the color tube driver circuit is directly applied to a detector circuit, so that a desirable detection signal or a desirable reproduced picture is not obtained. Besides, such a circuit has not been sufficiently studied for adaptation to the form of a semiconductor integrated circuit.

SUMMARY OF THE INVENTION

An object of this invention is to provide a color signal reproducing system in which the optimum reproduced picture is obtained, and a circuit for the same.

Another object of this invention is to provide a color signal reproducing system in which an appropriate hue level detection signal is obtained, and a circuit for the same.

Another object of this invention is to provide a color signal reproducing system in which a hue level detection signal can be adjusted, and a circuit for the same.

Another object of this invention is to provide a color signal reproducing system in which an appropriate chroma level detection signal is obtained, and a circuit for the same.

Another object of this invention is to provide a color signal reproducing system in which a chroma level detection signal can be adjusted, and a circuit for the same.

Another object of this invention is to provide a color signal reproducing circuit which is equipped with a detector circuit suitable for the hue or chroma level detection.

Another object of this invention is to provide a color signal reproducing circuit which is equipped with a detector circuit capable of setting a reference level suitable for the hue or chroma level detection.

Another object of this invention is to provide a color signal reproducing circuit which is equipped with the detector circuit suitable for a semiconductor integrated circuit.

Another object of this invention is to provide a color signal reproducing circuit in which no undesirable control is made when no VIR signal is transmitted.

Another object of this invention is to provide a color signal reproducing circuit which is equipped with a detector circuit imposing few restrictions on a circuit that receives an output signal from the detector circuit.

Another object of this invention is to provide a color signal reproducing circuit in the form of a semiconductor integrated circuit which is applicable to various color television receivers.

Another object of this invention is to provide a color signal reproducing circuit which is adapted to consume little power.

Another object of this invention is to provide a color signal reproducing circuit which is less prone to malfunctions.

Still other objects of this invention will become apparent from the following description taken in conjunction with the accompanying drawings.

BRIEF DESCRIPTION OF THE DRAWINGS

FIG. 7 is a diagram of a circuit according to this invention which is connected to an output terminal of the circuit shown in FIG. 2, and FIGS. 8 through 11 are circuit diagrams showing further embodiments of this invention.

DESCRIPTION OF THE PREFERRED EMBODIMENTS

Figure 1:
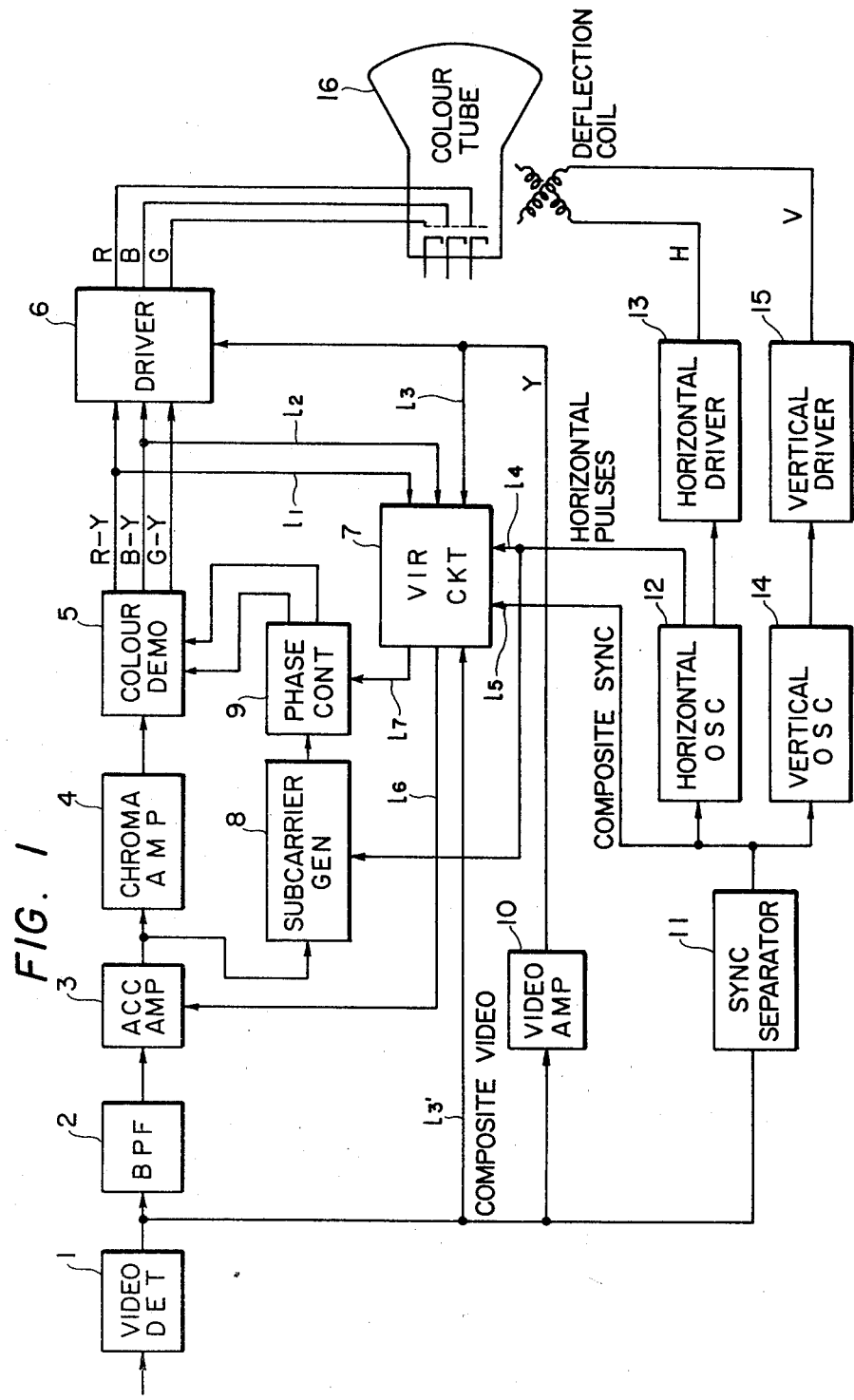
FIG. 1 is a block diagram showing an embodiment of this invention.

FIG. 1 is a block diagram of a color signal reproducing circuit which is an embodiment of this invention. In the figure, other circuits for a color television receiver such as a tuner, video IF amplifier circuit, audio IF amplifier circuit, voice detector circuit, voice power amplifier circuit and color killer circuit are not shown because they are not directly pertinent to this invention.

Referring to FIG. 1, a video detector circuit 1 detects the video IF signal of an input and thus provides a composite video signal as an output. The composite video signal is applied to a band-pass filter circuit 2, a video signal amplifier circuit 10 and a synchronizing pulse separator circuit 11.

The band-pass filter circuit 2 delivers a chroma signal, the video signal amplifier circuit 10 delivers a luminance signal Y, and the synchronizing pulse separator circuit 11 delivers a composite synchronizing signal which includes a horizontal synchronizing signal and a vertical synchronizing signal.

The composite synchronizing signal is applied to a horizontal oscillator circuit 12 on one hand, and a vertical oscillator circuit 14 on the other. One output of the horizontal oscillator circuit is applied to a horizontal driver circuit 13. An output of the vertical oscillator circuit is applied to a vertical driver circuit 15.

The chroma signal of the band-pass filter circuit 2 is applied to an automatic color control (ACC) circuit 3. The ACC circuit 3 receives a control signal from a VIR circuit 7 to be explained later, and delivers an amplitude-controlled chroma signal. The chroma signal delivered from the control circuit 3 is connected to a color demodulator circuit 5 through a chroma signal amplifier circuit 4 on one hand, and is applied to a color subcarrier signal generator circuit 8 on the other.

The color subcarrier signal generator circuit 8 receives as a gate signal, pulses from the horizontal oscillator circuit 12 synchronous with horizontal synchronizing pulses, samples a burst signal inserted in the pedestal portion of the horizontal synchronizing signal, and generates a color subcarrier signal synchronous with the burst signal.

The color subcarrier signal from the color subcarrier signal generator circuit 8 is connected to the color demodulator circuit 5 through a phase control circuit 9. The phase control circuit 9 delivers a color subcarrier signal whose phase is controlled on the basis of a control signal from the VIR circuit 7.

The color demodulator circuit 5 provides a red color difference signal R-Y, a blue color difference signal B-Y and a green color difference signal G-Y on the basis of the chroma signal and the color subcarrier signal which have been received.

The color difference signals R-Y, B-Y and G-Y are applied to a driver circuit 6. The driver circuit 6 also receives the luminance signal Y from the video amplifier circuit 10. It combines these input signals, and provides signals R, B and G for driving a color tube 16.

The red color difference signal R-Y and the blue color difference signal B-Y of the color demodulator circuit 5 are also applied to the VIR circuit 7.

On the basis of a VIR signal broadcast and received, the VIR circuit 7 delivers the control signal to the phase control circuit 9 for the hue control and also the control signal to the ACC circuit 3 for the chroma control.

As a result of such controls, the color demodulator circuit 5 delivers the color difference signals corresponding to transmitted color difference signals.

The VIR signal is inserted at the predetermined instant of the horizontal signal time within a vertical flyback time, for example, the nineteenth horizontal signal time within a vertical flyback time in the United States. It has a chrominance period which is transmitted simultaneously with the predetermined level of a luminance signal, and a reference level period which agrees with the black level of the luminance signal.

In the broadcast, the blue color difference signal is modulated by a reference color subcarrier signal, the red color difference signal is modulated by a color subcarrier whose phase leads the reference color subcarrier signal by 90°, and the burst signal inserted in the pedestal period of the synchronizing signal is made a signal whose phase leads by a further 90°.

The chrominance described above is transmitted as a signal in phase with the burst signal. Accordingly, the chrominance is opposite in phase to the color subcarrier signal for transmitting the blue color difference signal.

As a result, at the time that the chrominance of the VIR signal is being received, the level of the red color difference signal of the color demodulator circuit 5 in FIG. 1 has a value which is proportional to the phase difference between the phase of the reproduced color subcarrier signal from the phase control circuit and the phase of the received chrominance. If these phases are in agreement, the level of the red difference signal output terminal becomes equal to the reference black level because the chrominance is demodulated by the signal of the 90° phase shift.

Likewise, the level of the blue color difference signal of the color demodulator circuit 5 at the time that the chrominance of the VIR signal is being received becomes a negative value agreeing with the level of the chrominance because the chrominance is demodulated by the signal which is substantially opposite in phase thereto. As previously stated, at the time of the chrominance, both the level of the luminance signal and the level of the blue color difference signal are accurately regulated. The level of the chroma signal to enter the color demodulator circuit 5 therefore can be controlled on the basis of the comparison between the luminance signal Y and the blue color difference signal of the demodulator circuit 5.

In order to decide the period for detecting the VIR signal within the vertical flyback time, the VIR circuit 7 receives the composite synchronizing signal and the horizontal synchronizing signal from the synchronizing pulse separator circuit 11 and the horizontal oscillator circuit 12, respectively.

Accordingly, as stated before, the reproduced color signals can be brought into agreement with the transmitted color signals by the use of the VIR circuit.

In a color picture tube employing fluorescent substances of the three primary colors, however, the respective fluorescent substances ordinarily have peculiar fluorescence characteristics, so that correct hues do not reappear with the reproduced color signals which agree with the transmitted color signals.

In order to reproduce desirable hues in the color tube, in general the color demodulator circuit is manipulated.

In order to reproduce a desirable flesh color, in many cases the reproduced color subcarrier signal for demodulating the blue color difference signal is adjusted to as to become substantially in phase with the transmitted color subcarrier signal, whereas the reproduced color subcarrier signal for demodulating the red color difference signal is adjusted to a phase somewhat leading over the phase of the transmitted signal.

Owing to such a manipulation, during the reception of the VIR signal, the blue color difference signal from the color demodulator circuit 5 reflects the level of the chrominance substantially accurately. In contrast, the red color difference signal becomes a level proportional to the phase difference between the chrominance and the reproduced color subcarrier signal of the previously-advanced phasic value even when the phase of the chrominance is identical with the phase of the color subcarrier signal for demodulating the blue color difference signal, that is, even when the receiving set reproduces the correct color subcarrier signal.

Since, as previously stated, the VIR circuit 7 is constructed so as to control the phase of the reproduced color subcarrier signal on the basis of the red color difference signal from the color demodulator circuit 5 during the reception of the VIR signal, it delivers an erroneous phase control signal on the basis of the phasic value advanced in surplus.

In the color signal reproducing circuit of the embodiment, the color difference signals from the color demodulator circuit are corrected on the input side of the VIR circuit 7 in advance according to the idea of this invention.

According to this invention, the correction is made with a correction signal which has been obtained on the basis of a received video signal. Such a relative correction system based on the received signal has the merit that influence on the operating characteristic ascribable to dispersion in the characteristics of circuit elements or to the drift is much less than in other correction systems considered, for example, fixed systems such as a system which utilizes a correction signal of a fixed level prepared by the circuit itself and a system which alters the operating point of the circuit so as to cancel a pre-estimated deviation due to the manipulation.

For the red color difference signal from the color demodulator circuit 5, the blue color difference signal of the same demodulator circuit 5 is used as the correction signal.

Although both the first color subcarrier signal for demodulating the red color difference signal and the second color subcarrier signal for demodulating the blue color difference signal as are supplied from the phase control circuit 9 to the color demodulator circuit 5 are subjected to the phase control by the control signal delivered from the VIR circuit 7, the phase difference between the two color subcarrier signals is fixed. Therefore, in the state under which the second color subcarrier signal is synchronous with the chrominance of the VIR, that is, in the state under which the phases of the second color subcarrier signal and the chrominance shift 180°, the level of the red color difference signal of the color demodulator circuit 5 corresponds exactly to the level of the blue color difference signal under the condition that the proportion constant is a value determined by the fixed phase difference. The chrominance of the transmitted VIR signal is in phase with the burst signal. Accordingly, the demodulated blue color difference signal during the reception of the VIR signal has a negative value with respect to the reference level. In contrast, the red color difference signal has a positive level.

Accordingly, the signal which is obtained by adding the blue color difference signal to the red color difference signal from the color demodulator circuit 5 with the predetermined proportional value can be made a corrected level which becomes the reference level during the reception of the VIR signal under the synchronous state of the phases.

In other words, the corrected red color difference signal which is obtained by the addition as above stated becomes equivalent to a red color difference signal which is obtained from a color demodulator circuit that would receive a color subcarrier signal with its reference phase agreeing with the phase of the modulation axis of the transmission. Such an addition can be executed with resistors. The addition ratio is alterable and the phase difference between the VIR signal and the color subcarrier signal can be changed by the alteration of the addition ratio, so that the hue of the reproduced picture can be varied as one pleaes.

As described before, the level of the chrominance of the transmitted VIR signal is in the predetermined proportional relation with the level of the luminance signal. By combining the luminance signal during the reception of the VIR signal and the demodulated blue color difference signal, therefore, it is possible to make the combined or composite signal the reference level when the levels of both the received chroma signal and the luminance signal have agreed with those of the transmitted signals. The VIR circuit 7 controls the automatic color control circuit 3 until the composite signal comes to demonstrate the reference level. That is, the chroma is controlled. The composition can be carried out with a simple adder circuit because the luminance signal exhibits a positive level and the blue color difference signal a negative level relative to the reference level during the VIR reception.

Figure 2:
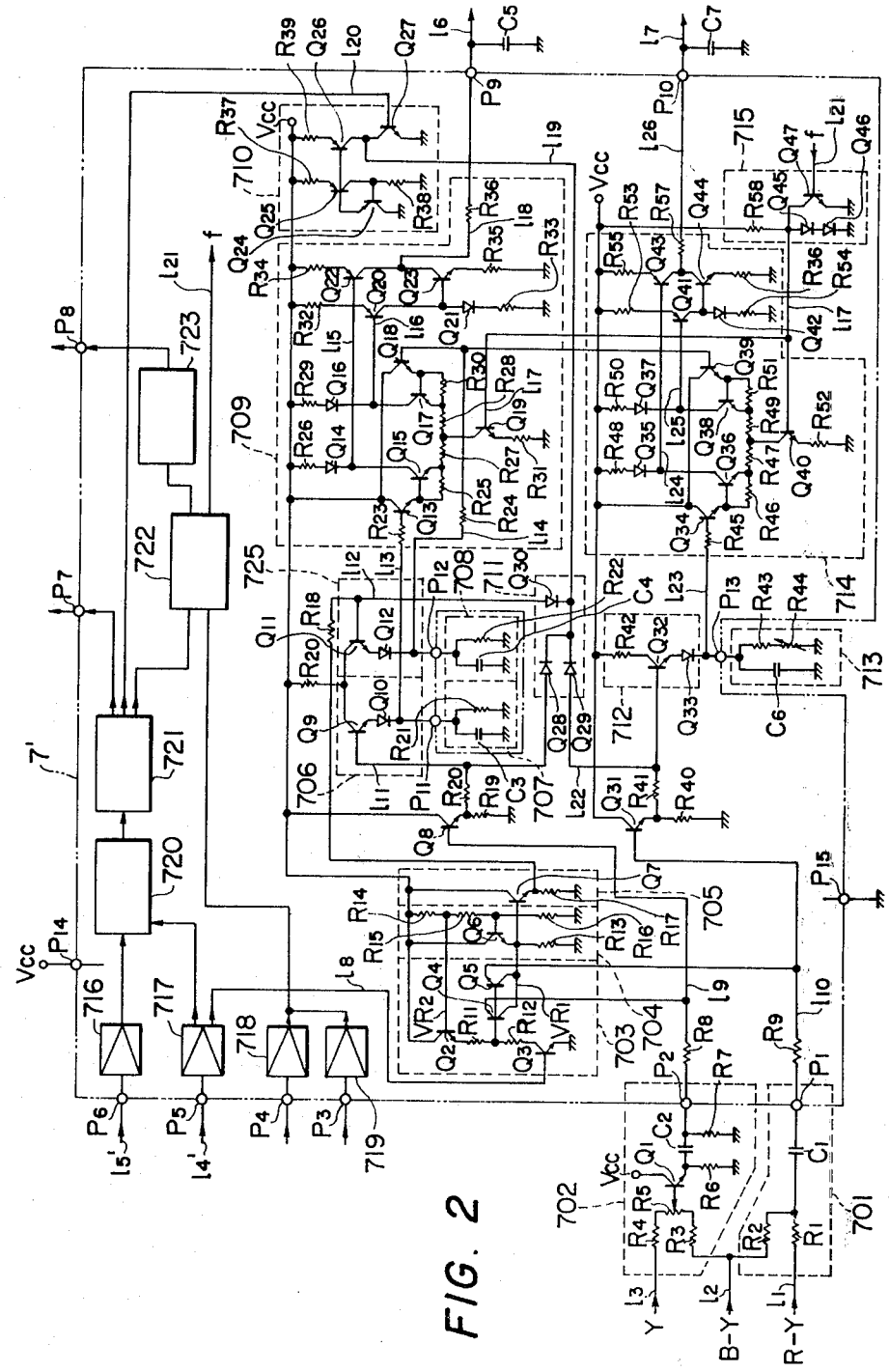
FIGS. 2 and 3 are diagrams of specific circuits which are used in the circuit of FIG. 1, FIGS. 4a and 4b, FIG. 5 and FIG. 6 are diagrams of operating waveforms in the circuits according to this invention.
Figure 3:
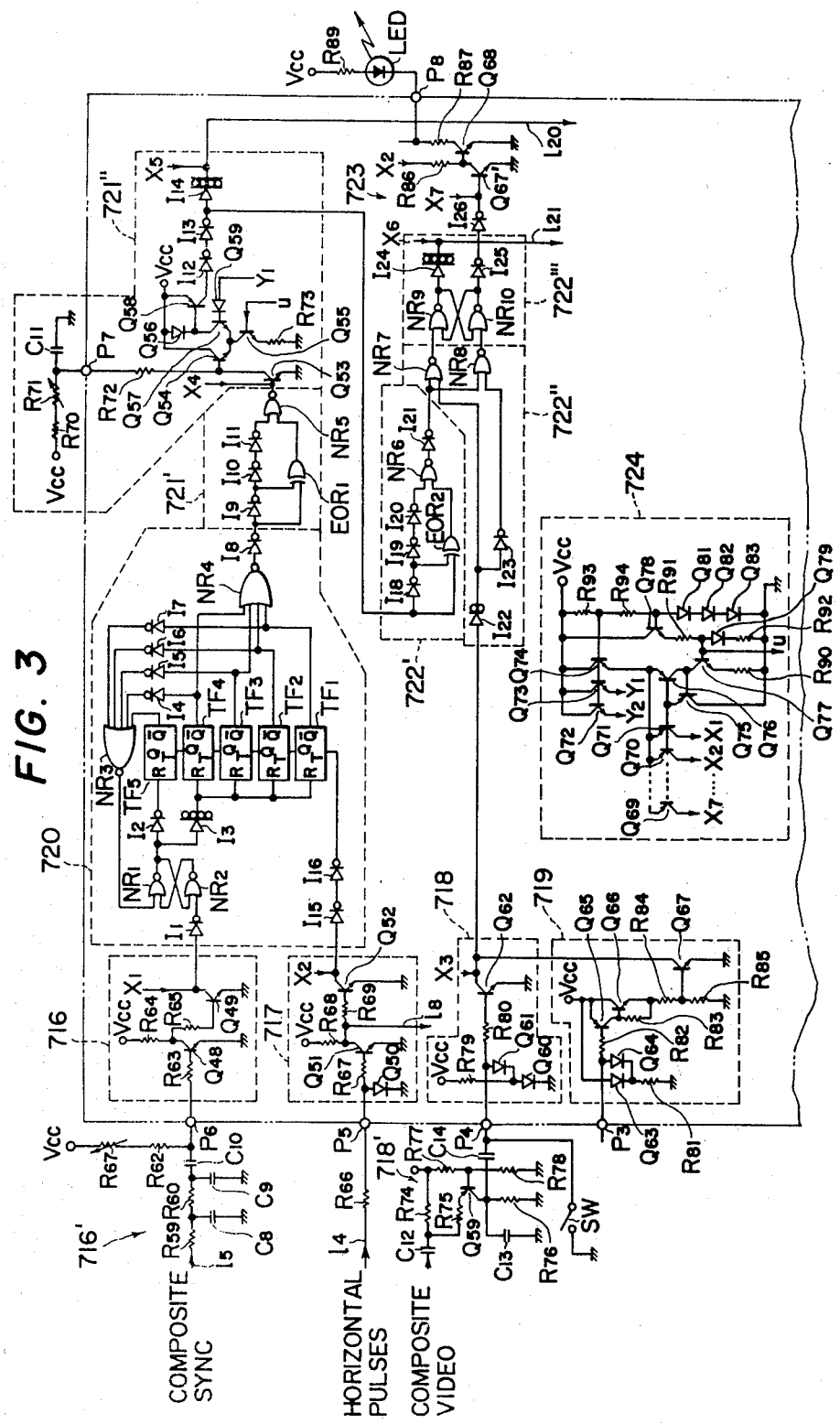

FIG. 2 shows the details of the VIR circuit 7 in FIG. 1, while FIG. 3 shows the details of circuits in blocks arranged on the upper side of FIG. 2. FIGS. 4a, 4b, 5 and 6 are operating waveform diagrams of the circuits.

In FIG. 2, a part surrounded with a one-dot chain line is a portion which is put into the form of a semiconductor integrated circuit device (termed "IC"). $P_1$ to $P_{15}$ designate external terminals of the IC. Parts surrounded with broken lines construct respective circuit blocks. Circuit elements are added to the external terminals $P_3$ to $P_8$ in FIG. 2, and the details are illustrated in FIG. 3 in relation to the external terminals of the same symbols $P_3$–$P_8$.

Figure 5:
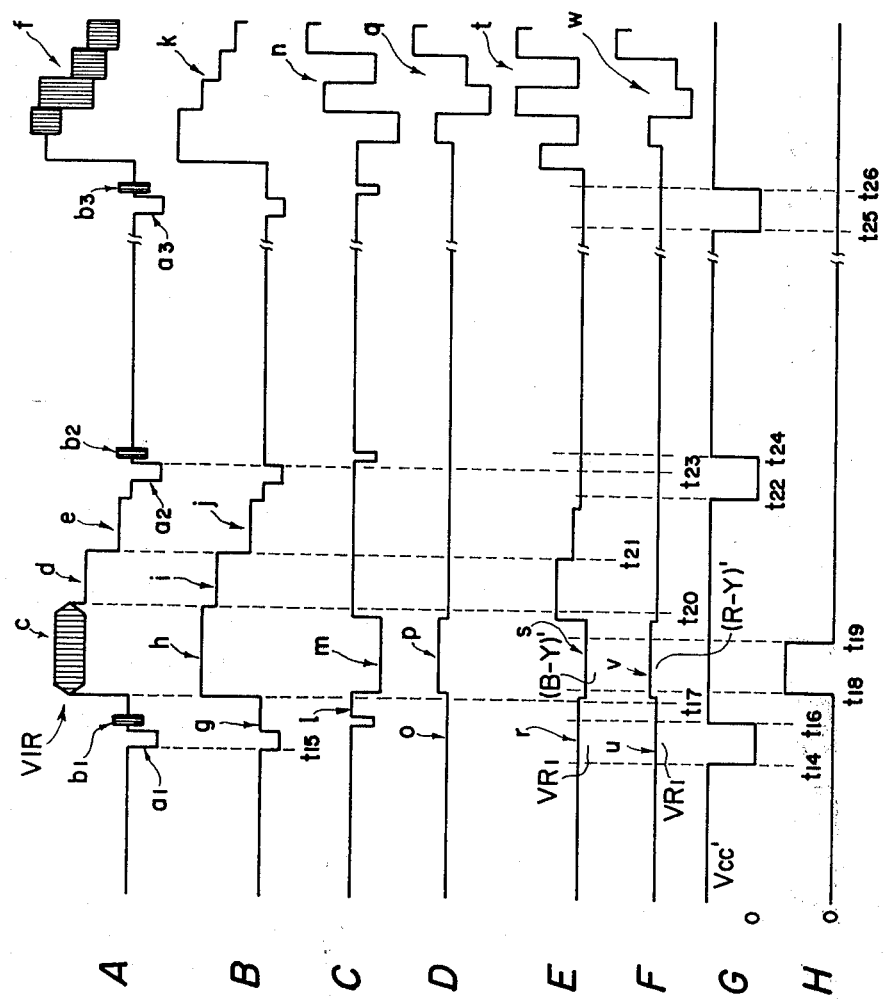

As shown at A in FIG. 5, the detection signal of the video detector circuit 1 in FIG. 1, especially the detection signal in the vertical flyback time consists of synchronizing signals $a_1$–$a_3$, burst signals $b_1$–$b_3$ inserted in the pedestal portions of the synchronizing signals $a_1$–$a_3$, a VIR signal VIR, etc. The luminance signal from the video amplifier circuit 10 becomes as shown at B in FIG. 5, and the color difference signals B-Y and R-Y from the color demodulator circuit 5 become as shown at C and D in FIG. 5, respectively.

The respective color difference signals R-Y and B-Y at D and C in FIG. 5 which are applied to input lines $l_1$ and $l_2$ of the VIR circuit in FIG. 2 are added at the node between resistances $R_1$ and $R_2$ of a composer circuit 701. The addition ratio of the two signals at the node is set at such a value as produces the red color difference signal corrected as previously described. To this end, the resistances $R_1$ and $R_2$ are respectively selected at e.g. 10 KΩ and 100 KΩ though there is no special limitation.

The signal at the node is supplied to a line $l_{10}$ through a capacitor $C_1$ having a sufficiently large capacitance, the external terminal $P_1$ of the IC and a resistance $R_9$.

The line $l_{10}$ is connected to the emitter of a transistor $Q_5$ of a switching circuit 703, and the base of an emitter follower transistor $Q_{31}$ constituting a buffer circuit.

The switching circuit 703 consists of transistors $Q_2$–$Q_5$ and resistances $R_{11}$ and $R_{12}$. This circuit 703 receives bias voltages $V_{R1}$ and $V_{R2}$ from a first reference power supply circuit 704 receiving a supply voltage $V_{CC}$, and receives a switching control signal at the base of the transistor $Q_3$. When the transistor $Q_3$ is held in the "on" state by the switching control signal, the potential of the juncture of the resistances $R_{11}$ and $R_{12}$ is at a low level, and the transistors $Q_4$ and $Q_5$ are in the "off" state. Under this condition, the emitters of the transistors $Q_4$ and $Q_5$ are reverse-biased by the potentials of lines $l_9$ and $l_{10}$ to be described later, and they present sufficiently high impedances to the lines $l_9$ and $l_{10}$.

When the transistor $Q_3$ is in the "off" state, the potential of the juncture of the resistances $R_{11}$ and $R_{12}$ is at a high level. This high level is a level which is enough to bring the transistors $Q_4$ and $Q_5$ into saturation operation. At this time, the transistors $Q_4$ and $Q_5$ effect the bidirectional switching operation and couple the lines $l_9$ and $l_{10}$ to the output $V_{R1}$ of the first reference power supply circuit under a low impedance in the saturation operation. As a result, the potentials of the lines $l_9$ and $l_{10}$ are forcibly set substantially at the output potential $V_{R1}$ of the circuit 704.

The period of time during which the transistors $Q_4$ and $Q_5$ are in the "on" state is selected to lie, for example, within the period of time during which the corrected red color difference signal at the node of the resistances $R_1$ and $R_2$ of the composer circuit 701 exhibits the reference level.

In consequence, during the period of the forcible potential setting, a voltage which is equal to the potential difference between the potential $V_{R1}$ and the reference level of the corrected red color difference signal at the node of the resistances $R_1$ and $R_2$ is applied across both the terminals of the capacitor $C_1$. Since the capacitance value of the capacitor $C_1$ is made the sufficiently great as stated previously, the voltage across both the terminals of the capacitor $C_1$ maintains a constant value set by the potential difference even in a period other than the forcible period.

At the time when the VIR signal is being received, the transistor $Q_5$ is held in the "off" state.

Owing to the capacitor $C_1$, the corrected color difference signal which varies from the reference level appearing at the node of the resistances $R_1$ and $R_2$ is converted, whatever level this reference level may be, into a signal having the potential $V_{R1}$ as its reference level on the line $l_{10}$. The circuitry in which the reference level is changed within the circuit in this manner has the function of stabilizing the operating point of the circuit in the IC form.

The period during which the forcible potential is set is not especially restricted if it lies within the period during which the color difference signal exhibits the reference level.

In this embodiment, the transistor $Q_3$ is controlled by horizontal flyback pulses which are synchronized with horizontal synchronizing pulses as shown at G in FIG. 5 produced by the circuit 12 of FIG. 1 on the basis of the synchronizing pulses $a_1$–$a_3$. Accordingly, the periods of the forcible potential setting become $t_{14}$–$t_{16}$, $t_{22}$–$t_{24}$ and $t_{25}$–$t_{26}$ in FIG. 5.

The potential of the line $l_{10}$ in FIG. 2 is set at the potential $V_{R1}$ in the periods $t_{14}$–$t_{16}$, $t_{22}$–$t_{24}$, etc. as shown at F in FIG. 5, and changes similarly to the corrected red color difference signal whose reference level is the potential $V_{R1}$.

The blue color difference signal B—Y and the luminance signal Y on the respective lines $l_2$ and $l_3$ are added by resistors $R_3$ and $R_4$ and a variable resistor $R_5$ of a composer circuit 702. The composite signal is supplied to the line $l_9$ through an emitter follower transistor $Q_1$, a capacitor $C_2$, the external terminal $P_2$ of the IC and a resistor $R_8$. The capacitor $C_2$ is given a sufficiently large capacity as in the case of capacitor $C_1$.

The emitter of the transistor $Q_4$ of the switching circuit 703 and the base of an emitter follower transistor $Q_8$ constituting a buffer circuit are connected to line $l_9$ as similarly connected to line $l_{10}$. As shown at E in FIG. 5, a corrected blue color difference signal which is forcibly set at the potential $V_{R1}$ in the periods $t_{14}$–$t_{16}$, $t_{22}$–$t_{24}$ and $t_{25}$–$t_{26}$ appears on the line $l_9$.

The output voltage $V_{R1}$ of the first reference power supply circuit 704 is also supplied to a second power supply circuit 705 which consists of a transistor $Q_7$ and a resistor $R_{17}$.

An output voltage of the second power supply circuit 705 becomes lower than the potential $V_{R1}$ by the base-emitter forward voltage of the transistor $Q_7$. On the other hand, the potentials of the lines $l_9$ and $l_{10}$ during the saturated operations of the transistors $Q_4$ and $Q_5$ of the switching circuit 703 are approximately $V_{R1}$ as described previously. Accordingly, the emitter potential of the emitter follower transistor $Q_8$ or $Q_{31}$ at this time and the output voltage of the second power supply circuit 705 are substantially equal.

The emitter output of the transistor $Q_{31}$ is supplied to a sampling circuit 712 through a resistor $R_{41}$.

The output voltage of the second power supply circuit 705 is supplied to a sampling circuit 725 through a resistor $R_{18}$.

The sampling circuit 712 is constructed of a transistor $Q_{32}$, a diode $Q_{33}$ and a resistor $R_{42}$. Its output is supplied through the external terminal $P_{13}$ of the IC to a holding circuit 713 which consists of a capacitor $C_6$, a resistor $R_{43}$ and a variable resistor $R_{44}$.

The base of the transistor $Q_{32}$ is connected to a buffer circuit 710 through a diode $Q_{29}$ of a gate circuit 711.

Likewise, the output of the sampling circuit 725 is connected to a holding circuit 708 through the terminal $P_{12}$, and the base of a transistor $Q_{11}$ of the sampling circuit 725 is connected to a diode $Q_{30}$ of the gate circuit 711.

The buffer circuit 710 receives on a line $l_{20}$ the output of a waveform shaping circuit 721 to be described later, and delivers to a line $l_{19}$ a control signal which attains a high level during only the chrominance period $t_{18}$–$t_{19}$ of the VIR signal as shown at H in FIG. 5. The high level of the circuit 710 is set at a potential which is higher than the highest level of the color difference signals appearing on the lines $l_9$ and $l_{10}$, while the low level is set at a potential which is lower than the lowest level of the color difference signals on the lines $l_9$ and $l_{10}$.

Accordingly, when the output of the buffer circuit 710 is at the low level, the respective diodes of the gate circuit 711 attain the forward-biased state, so that the base potentials of the transistors $Q_{32}$ and $Q_{11}$, i.e., the potentials of lines $l_{22}$ and $l_{12}$ become fixed low potentials which are determined by the low level of the buffer circuit 710 and the forward voltages of the diodes. Conversely, when the output of the buffer circuit 710 is at the high level, the respective diodes of the gate circuit 711 are in the reverse-biased state. At this time, the base potentials of the transistors $Q_{32}$ and $Q_{11}$ correspond to the potentials of the lines $l_{10}$ and $l_9$ on which the color difference signals appear.

The transistor $Q_{32}$ and the diode $Q_{33}$ of the sampling circuit 712 operate as a kind of rectifier element, and they are rendered conductive when the potential of the line $l_{22}$ is high with respect to the potential of the output terminal $P_{13}$. Accordingly, the sampling period of the sampling circuit 712 is set at the period $t_{18}$–$t_{19}$ as indicated at H in FIG. 5.

As a result, the holding circuit 713 holds a potential which corresponds to the potential of the corrected red color difference signal (R—Y)' in the chrominance period of the VIR signal as illustrated at F in FIG. 5.

Likewise, the holding circuit 708 holds a potential corresponding to the output potential of the second power supply circuit 705 in the same period as that of the holding circuit 713.

The difference between the held potentials in the holding circuits 713 and 708 immediately after the sampling agrees with the quantity of level change of the corrected red color difference signal during the VIR signal receiving time.

The capacitor $C_6$ of the holding circuit 713 and a capacitor $C_4$ of the holding circuit 708 are respectively provided with a discharging path made up of the resistors $R_{43}$ and $R_{44}$ and a discharging path made up of a resistor $R_{22}$. The discharging paths lower the held potentials of the holding circuits 713 and 708 immediately before the initiation of the sampling in the reception of the VIR signal in the next vertical flyback time. Accordingly, it is facilitated to sample and hold the renewed signals in the next time, and the circuit comes to have a quick response characteristic.

Owing to the sampling at every vertical flyback time as described above, the held potential of the holding circuit 708 changes as indicated by a solid-line curve a at B in FIG. 6, while the held potential of the holding circuit 713 changes as indicated by a broken-line curve b at B in the figure.

The broken-line curve b can have its slope changed by the variable resistor $R_{44}$ constituting the discharging path. By adjusting the resistor $R_{44}$, accordingly, the difference between the held potentials of the holding circuits 713 and 708 in a non-sampling period can be adjusted.

The held potentials of the holding circuits 713 and 708 are supplied to a differential amplifier circuit 714 as voltage differential input signals, and then amplified.

The differential amplifier circuit 714 is constructed of an input circuit which is made up of transistors of differential operations $Q_{34}$, $Q_{36}$, $Q_{38}$ and $Q_{39}$, resistors $R_{46}$, $R_{47}$, $R_{49}$ and $R_{51}$, resistors as loads $R_{48}$ and $R_{50}$, diodes $Q_{35}$ and $Q_{37}$ and a constant-current transistor $Q_{40}$ as well as its emitter resistor $R_{52}$, and an output circuit which is made up of transistors $Q_{41}$, $Q_{43}$ and $Q_{44}$, a diode $Q_{42}$ and resistors $R_{53}$ to $R_{57}$.

The output end of the output circuit is connected to the collectors of the p-n-p transistor $Q_{43}$ and the n-p-n transistor $Q_{44}$.

Accordingly, the differential amplifier circuit 714 produces a current output in response to the voltage differential inputs.

If the level of the corrected red color difference signal during the reception of the VIR signal lies at a positive potential with respect to the reference level thereof, the base potential of the differential transistor $Q_{34}$ becomes higher than the base potential of the differential transistor $Q_{39}$, so that the collector current of the p-n-p transistor $Q_{43}$ of the output circuit becomes higher than the collector current of the n-p-n transistor $Q_{44}$. As a result, a current which corresponds to the difference of the collector currents of the transistors $Q_{43}$ and $Q_{44}$ flows out to the external terminal $P_{10}$ of the IC. If the differential input signals are inverse to the stated described above, a current which corresponds to the difference flows into the external terminal $P_{10}$.

The terminal $P_{10}$ is connected to the control terminal of the phase control circuit 9 in FIG. 1 through a line $l_7$.

The phase control circuit 9 is provided with an input circuit which is constructed of a differential amplifier circuit as shown in FIG. 7. The output current at the terminal $P_{10}$ flows through a resistor $R_{98}$ connected between a pair of differential input terminals in FIG. 7, and is converted into a voltage signal by this resistor $R_{98}$. A capacitor $C_7$ connected to the terminal $P_{10}$ has a smoothing function for turning such a signal into a D.C. control signal.

The differential amplifier circuit of the type providing the current signal as stated above does not restrict the arrangement of a circuit which receives the output signal. More specifically, since the output transistors $Q_{43}$ and $Q_{44}$, FIG. 2, have high collector impedances, the circuit exhibits a high output impedance. Therefore, whatever value the input reference operating potential of the input circuit receiving the current output signal may have, the current output signal can be converted into a signal corresponding to the reference operating potential by conversion means of simple construction such as a resistor connected to the input terminal of the input circuit. The differential amplifier circuit can be made a direct signal source for any input circuit operating with a current input.

Further, in a state in which the collector currents of the output transistors $Q_{43}$ and $Q_{44}$ are approximately in agreement, current at the output terminal $P_{10}$ is negligible. In such a state, the external terminal $P_{10}$ is substantially floating owing to the high output impedance characteristic of the differetial amplifier circuit 714. This state is almost equivalent to a state in which the differential amplifier circuit 714 is not operated, that is, a state in which the collector currents of the output transistors $Q_{43}$ and $Q_{44}$ are made zero.

Accordingly, by constructing the circuit so that the collector currents of the output transistors $Q_{43}$ and $Q_{44}$ of the differential amplifier circuit 714 may agree for differential input signals which are produced when a video signal with no VIR signal inserted therein is received, the control output signal from the differential amplifier circuit 714 to the phase control circuit 12 can be placed substantially in the "off" state without using any special control means.

In the embodiment shown in FIG. 2, however, control means for putting the control signal into the "off" state is disposed for reasons at stated below.

The IC enclosed with the one-dot chain line in FIG. 2 is used for various color television receivers. In such case, the alteration of the control output level at the terminal $P_{10}$ is required in some receivers. To meet the requirement, e. g. the series resistance value of the resistors $R_{43}$ and $R_{44}$ of the holding circuit 713 is adjusted so as to alter the variation of the held potential of the holding circuit 713 from the variation characteristic as indicated by the broken-line curve b at B in FIG. 6, whereby a substantial offset is bestowed on the differential input signals to be applied to the differential amplifier circuit 714. In some color television receivers, therefore, the differential amplifier circuit 714 provides an output current at the terminal $P_{10}$ in response to the video signal with no VIR signal inserted therein.

For the control described above, a control transistor $Q_{47}$ is connected in parallel with a bias circuit 715, for the constant-current transistor $Q_{40}$ of the differential amplifier circuit 714, composed of a resistor $R_{58}$ and diodes $Q_{45}$ and $Q_{46}$. The base of the control transistor $Q_{47}$ is connected through a line $l_{21}$ to an output terminal of a VIR signal detector circuit 722 to be described later.

The control transistor $Q_{47}$ is in the "off" state during the period of the video signal with the VIR signal inserted therein, and it is in the "on" state at the other time. The constant-current transistor $Q_{40}$ is controlled by the control transistor $Q_{47}$, and is in the "off" state during the period of the video signal including no VIR signal. As a result, the differential amplifier circuit 714 falls into the non-operative state, and the collector currents of their output transistors $Q_{43}$ and $Q_{44}$ become zero.

On the line $l_9$ connected to the terminal $P_2$ through the resistor $R_8$, there appears the signal $(B-Y)'$ which is regulated to the potential $V_{R1}$ by the switching circuit 703 during the periods $t_{14}-t_{16}$, $t_{22}-t_{24}$ and $t_{25}-t_{26}$ and corresponds to the variation of the blue color difference signal $B-Y$ corrected by the luminance signal Y during the period $t_{18}-t_{19}$ as illustrated at E in FIG. 5.

The signal of the line l₉ is connected to a holding circuit 707 through the emitter follower transistor $Q_8$ as well as a sampling circuit 706. The sampling circuit 706 is controlled simultaneously with the sampling circuit 725. The variation of the held potential of the holding circuit 708 is indicated by a solid-line curve a at A in FIG. 6, while the variation of the held potential of the holding circuit 707 is indicated by a broken-line curve b at A in the figure. Immediately after the termination of the sampling, the potential difference between the held potential $V_{R1}'$ of the holding circuit 708 and the held potential (B—Y)' of the holding circuit 707 corresponds to the quantity by which the corrected blue color difference signal has varied on the basis of the VIR signal.

The potentials of the holding circuits 708 and 707 are applied as differential input signals to a differential amplifier circuit 709 which has the same construction as that of the differential amplifier circuit 714. As a result, a current signal corresponding to the variation of the corrected blue color difference signal is delivered to the external terminal P₉. The signal at the external terminal P₉ is supplied through a line l₆ to the ACC circuit in FIG. 1 as a control signal.

According to this invention, unlike the above construction wherein use is made of the sampling circuit 725 and the holding circuit 708 which are common to the differential amplifier circuits 709 and 714, a sampling circuit and a holding circuit can be disposed for each of the differential amplifier circuits 709 and 714.

However, the construction using the common sampling circuit and holding circuit as in the foregoing embodiment is advantageous in that the number of circuit elements decreases and in that the number of external terminals of the IC also decreases.

Now, circuit blocks 716 to 723 and circuits belonging thereto will be described with reference to FIG. 3.

In FIG. 3, each of inverter circuits I₁ to I₂₆, NOR circuits NR₁ to NR₁₀, exclusive OR circuits EOR₁ and EOR₂, and T-type flip-flop circuits with reset terminals TF₁ to TF₅ is constructed of an IIL (integrated injection logic). Bipolar transistors $Q_{49}$, $Q_{52}$, and $Q_{62}$ as well as $Q_{67}$ have their collectors connected to constant-current bias terminals X₁, X₂, and X₃ of a bias circuit 724 and construct interface circuits on the input sides of the IIL inverter circuits I₁, I₁₅, and I₂₂, respectively. The inverter circuits I₁, I₁₅ and I₂₂ have structures provided with no injector, and denoted by symbols different from those of the other inverter circuits in the drawing.

Likewise, constant-current bias terminals X₄ to X₇ of the bias circuit 724 are respectively connected to bipolar transistors $Q_{53}$, $Q_{27}$ (in FIG. 2), $Q_{47}$ (in FIG. 2) and $Q_{67}$ for interfaces on the output sides of the IIL circuits. A plurality of circles of the inverter circuit indicated in the drawing signify that a plurality of collectors are connected in parallel in order to increase the output driving current.

Figure 4A:
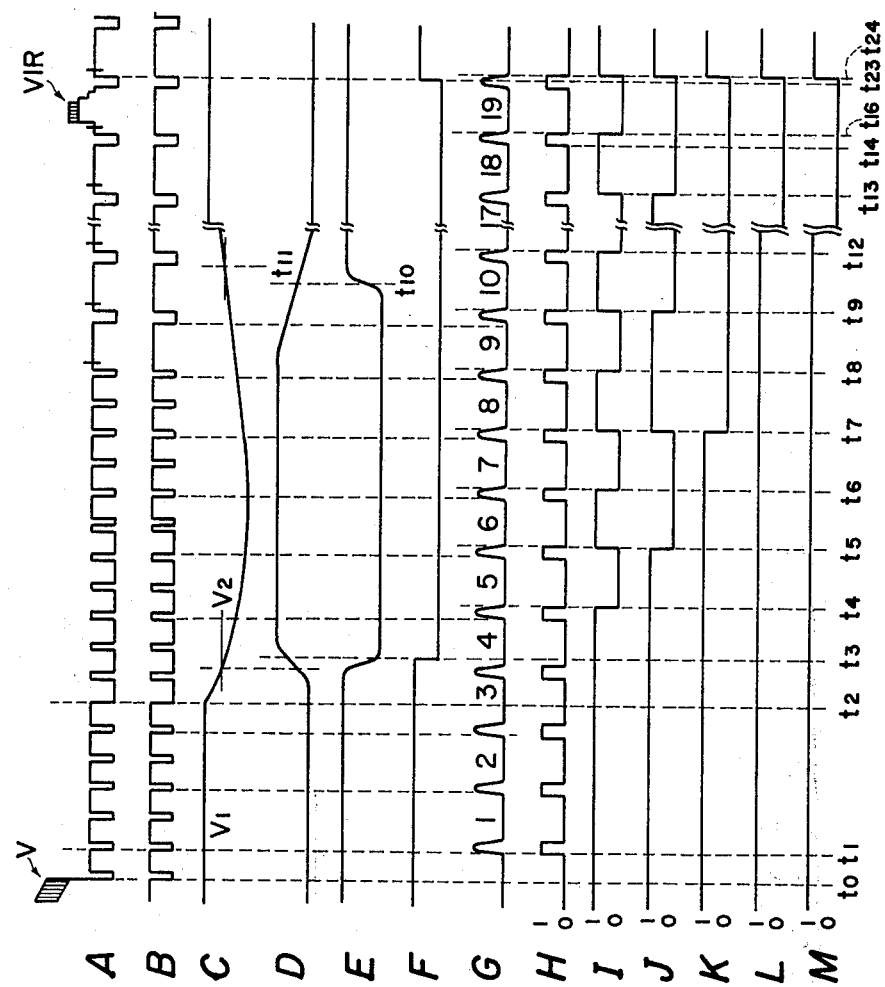

A video detection signal waveform in the vertical flyback time is shown at A in FIG. 4a. The synchronizing signal separator circuit 11 (refer to FIG. 1) separates horizontal and vertical synchronizing signals from the video detection signal of the negative polarity, and provides a synchronizing signal as shown at B in the figure.

A line l₅ in FIG. 3 is supplied with such a synchronizing signal. The signal on the line l₅ is integrated by a circuit 716' made up of resistors R₅₉ and R₆₀ and capacitors C₈ and C₉, and the integrated signal is supplied through a coupling capacitor C₁₀, the external terminal P₆ and a resistor R₆₃ to the base of a transistor $Q_{48}$ for detecting the vertical synchronizing signal.

The base of transistor $Q_{48}$ is biased by the power supply $V_{CC}$ through a variable resistor R₆₁ as well as a resistor R₆₂, and is in the "on" state before the vertical flyback time.

Following the equalizing pulse, a vertical synchronizing pulse of a long period of low level is impressed on the line l₅ from a time t₂. The output potential of the integration circuit 716' starts lowering at the time t₂ at which the vertical synchronizing pulse is generated, and starts rising at a time at which a vertical synchronizing pulse immediately before a time t₆ has ended. As a result, the base potential of the transistor $Q_{48}$ of a detector circuit 716 varies as illustrated at C in FIG. 4a. Owing to the nonlinear characteristic of the transistor $Q_{48}$, a waveform-shaped inverted signal as shown at D in the figure appears at the collector thereof. The interface transistor $Q_{49}$ which receives the collector potential of the transistor $Q_{48}$ is consequently held in the "on" state during a period t₃-t₁₀. As illustrated at E in FIG. 4a, the collector potential of the transistor $Q_{49}$ becomes a high level before the time t₃ and after the time t₁₀ and a low level during the period t₃-t₁₀.

The high level of the collector potential of the transistor $Q_{49}$ corresponds to logic value "1", and the low level to logic value "0". The output of the inverter circuit I₁ becomes the logic value "1" during the period t₃-t₁₀.

A line l₄ in FIG. 3 is supplied with a horizontal synchronizing signal as shown at G in FIG. 4a from the horizontal oscillator circuit 12 (refer to FIG. 1). Although the signal at G in the figure is expressed with a lowered level because of the limited space of the drawing, it is subjected to amplitude limitation by a resistor R₆₆ and a diode $Q_{50}$ and is supplied to the base of a transistor $Q_{51}$ of a waveform shaping circuit 717. A signal synchronous with the horizontal synchronizing signal as shown at G in FIG. 5 appears at the collector of the transistor $Q_{51}$, and a signal as shown at H in FIG. 4a appears at the collector of the interface transistor $Q_{52}$.

The output signal of the transistor $Q_{52}$ is supplied through the inverter circuits I₁₅ and I₁₆ to a trigger terminal T of the flip-flop circuit TF₁.

Inputs to a counter circuit 720 made up of an IIL are supplied by the transistor $Q_{49}$ previously described and the transistor $Q_{52}$.

The NOR circuits NR₁ and NR₂ constitute a latch circuit. The output of the latch circuit, i.e., the output of the NOR circuit NR₁ is set to "1" and holds this state when the input of the inverter circuit I₁ becomes "0", and it is reset to "0" when the output of the NOR circuit NR₃ becomes "1".

The flip-flop circuits TF₁ to TF₅ have their reset terminals R supplied with the output of the NOR circuit NR₁ through the inverter circuits I₂ and I₃. The flip-flop circuits TF₁ to TF₅ are connected in series, and operate as a binary counter. Output signals at inverting terminals $\overline{Q}$ of the flip-flop circuits TF₁ to TF₅ are shown at I to M in FIG. 4a, respectively.

At a time t₀, the flip-flop circuits TF₁ to TF₅ are in the reset state, and all the outputs $\overline{Q}$ are "1".

The flip-flop circuits have the reset state released by the output signal of the transistor $Q_{49}$ based on the vertical synchronizing signal. In the release of the reset state, the flip-flop circuit TF₁ is triggered by the trailing edge of the signal synchronous with the horizontal synchronizing signal from the transistor $Q_{52}$. As a result, the flip-flop circuits $TF_1$ to $TF_5$ start operating as the binary counter for the horizontal synchronizing pulses.

All the inversion outputs of the flip-flop circuits $TF_1$ to $TF_4$ become "0" during a period $t_{16}-t_{24}$ from the time that the flip-flop circuits are triggered by the fifteenth synchronizing pulse to the time when they are triggered by the sixteenth synchronizing pulse. Therefore, the output of the NOR circuit $NR_4$ becomes "1" during the period $t_{16}-t_{24}$ as illustrated at O in FIG. 4b.

The output of the NOR circuit $NR_3$ becomes "1" at a time $t_{23}$ owing to the outputs of the flip-flop circuits $TF_1$ to $TF_5$ based on the sixteenth synchronizing signal. Owing to this output of the NOR circuit $NR_3$, the output of the latch circuit becomes "1" as shown at F in FIG. 4a, and the flip-flop circuits $TF_1$ to $TF_5$ are reset. As seen at E in FIG. 4a, the signal for releasing the reset state from the transistor $Q_{49}$ terminates at a time $t_{10}$ which precedes the output of the NOR circuit $NR_3$. Accordingly, the flip-flop circuits do not operate for the seventeenth and subsequent synchronizing pulses.

The same counting operation as above described is repeated again in the vertical time of the next cycle.

The output of the NOR circuit $NR_4$ is supplied to a first waveform shaping circuit 721' through the inverter circuit $I_8$. The output of the inverter circuit $I_8$ delivers the inversion signal "0" of the NOR circuit $NR_4$ at a time which is later than the time $t_{16}$ by the delay time of the circuit. Likewise, the inverter circuit $I_9$ provides the inversion signal "1" at a time which lags over the output of the inverter circuit $I_8$. The output of the inverter circuit $I_{11}$ becomes "1" at a time which is later than the time $t_{16}$ by the delay times of the inverter circuits connected is series. The duration of the output "1" of the inverter circuit $I_{11}$ is substantially equal to that of the output "1" of the NOR circuit $NR_4$.

A pair of inputs of the exclusive OR circuit $EOR_1$ are non-coincident when the inverter circuit $I_9$ is in the steady operation state, and they are coincident during the delay time of the inverter circuit $I_9$ in the course of the variation of the signal. In consequence, the exclusive OR circuit $EOR_1$ provides "0" in correspondence with the delay time.

At the time of the rise of the input signal of the inverter circuit $I_8$, both the outputs of the inverter circuit $I_{11}$ and the exclusive OR circuit $EOR_1$ are "0". At the time of the fall of the input signal of the inverter circuit $I_{11}$, the output of the exclusive OR circuit $EOR_1$ becomes "0" again, but the output of the inverter circuit $I_{11}$ maintains "1".

Figure 4B:
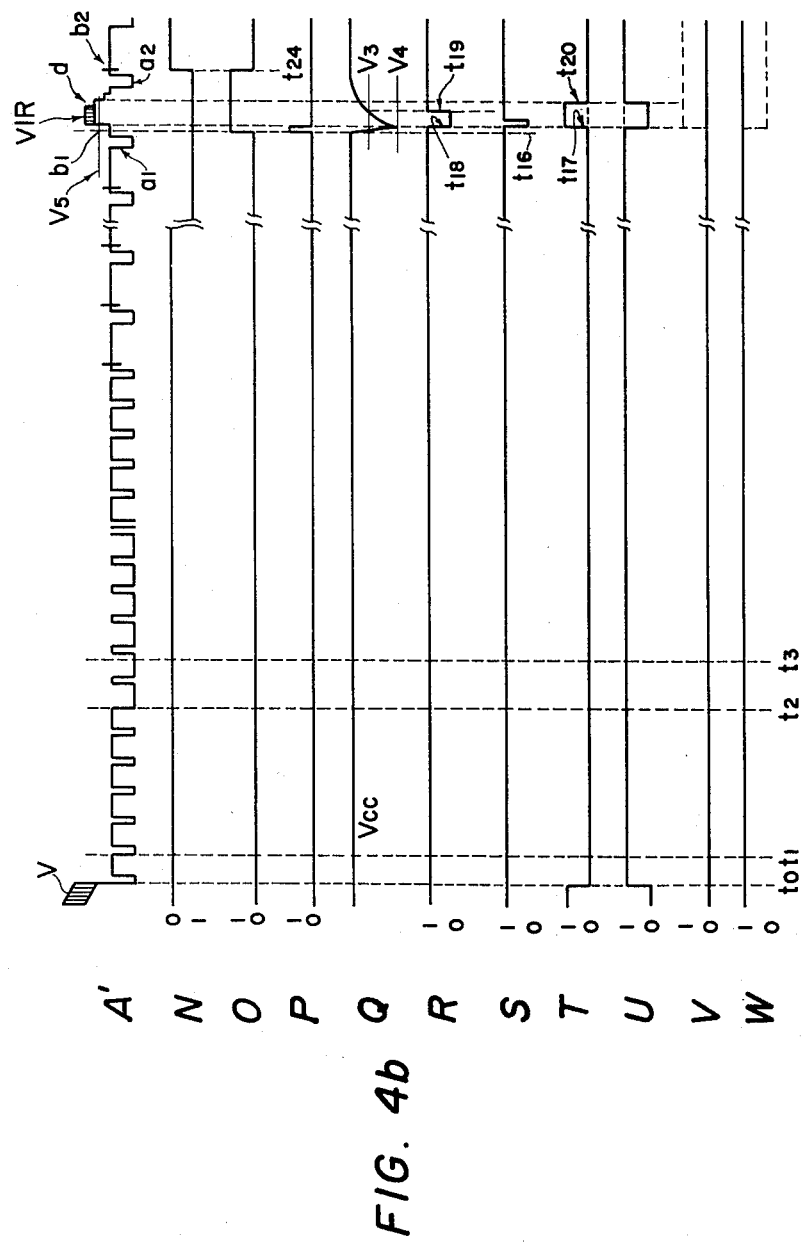

As a result, the NOR circuit $NR_5$ produces an output signal in response only to the leading edge of the signal of the NOR circuit $NR_4$ as shown at P in FIG. 4b.

The transistor $Q_{53}$ is brought into the "on" state by the output signal of the NOR circuit $NR_5$. A capacitor $C_{11}$ connected to the external terminal $P_7$ is charged substantially to the supply voltage $V_{CC}$ by a resistor $R_{70}$ and a variable resistor $R_{71}$ in advance. Charges stored in the capacitor $C_{11}$ are discharged through the transistor $Q_{53}$ when this transistor turns "on". Upon reversion of the transistor $Q_{53}$ to the "off" state, the charging of the capacitor $C_{11}$ is started again. In consequence, the potential of the terminal $P_7$ varies as shown at Q in FIG. 4b.

A comparator circuit is constructed of transistors of a differential operation $Q_{54}$ and $Q_{57}$, a diode $Q_{59}$, a constant-current transistor $Q_{55}$, a resistor $R_{73}$, a load diode $Q_{56}$ and an output transistor $Q_{58}$. The bases of the constant-current transistor $Q_{55}$ and the differential-operation transistor $Q_{57}$ are respectively connected to a bias terminal U and a terminal $Y_1$ of the bias circuit 724, the terminal $Y_1$ providing a comparison voltage $V_3$.

Since the comparator circuit has the comparison voltage $V_3$, the output current of the output transistor $Q_{58}$ becomes approximately zero during a period $t_{18}-t_{19}$ in response to the signal shown at Q in FIG. 4b. The output signal of the transistor $Q_{58}$ is supplied to the inverter circuit $I_{14}$ through the inverter circuits $I_{12}$ and $I_{13}$. As a result, the inverter circuit $I_{14}$ produces a signal which becomes "0" during a period $t_{18}-t_{19}$ as illustrated at R in FIG. 4b. The output signal of the inverter circuit $I_{14}$ is caused to appear within the chrominance period of the VIR signal, and it is supplied to the buffer circuit 710 through a line $l_{20}$.

The time for releasing the reset of the counter circuit 720 can be altered by adjusting the resistance of the variable resistor $R_{61}$ which belongs to the integrator circuit 716'. The width of the output pulse of the inverter circuit $I_{14}$ can be adjusted by the resistance of the variable resistor $R_{71}$.

An IIL inverter circuit has a threshold voltage at its input terminal, and a switching characteristic at its output terminal. It is therefore possible to alter the transistor $Q_{53}$ of a waveform shaping circuit 721'' into the IIL inverter circuit and to dispense with the comparator circuit. In the embodiment, however, it is taken into account that the control current value of the IIL inverter circuit is small, the threshold voltage thereof being also a low value of about 0.6 volt, and that the capacitor $C_{11}$ is difficult to be constructed within the IC, the external terminal $P_7$ for the capacitor $C_{11}$ being disposed. On the other hand, in case where the embodiment is altered as described above, the tolerance for noise to be applied to the terminal $P_7$ lowers on account of the low threshold voltage of the IIL circuit.

The combination between the IIL inverter circuits and the comparator circuit in FIG. 3 has a high noise tolerance because the comparator circuit is operated at the comparison voltage of comparatively high level.

Now, the VIR signal detector circuit will be explained.

The external terminal $P_4$ is fed with the composite video signal from the video detector circuit 1 (FIG. 1) through a grounded-base amplifier circuit 718' which is made up of capacitors $C_{12}$ to $C_{14}$, resistors $R_{74}$ to $R_{78}$ and a transistor $Q_{59}$, though this is not especially restricted. The amplified composite video signal is supplied to a level detector circuit 718.

The video signal which is supplied to the terminal $P_4$ is one of the negative polarity as depicted at A in FIG. 4a or as depicted again at A' in FIG. 4b. As indicated as $V_5$ at A' in FIG. 4b, the detection level of the transistor $Q_{62}$ within the IC is made such a value that the luminance signal level in the VIR signal period is detected.

The transistor $Q_{62}$ is accordingly brought into the "on" state by the video signal V and the VIR signal VIR. During the period of the video signal and the VIR signal, the output of the inverter circuit $I_{22}$ of a gate circuit 722'' receiving the output of the transistor $Q_{62}$ becomes "1" as shown at T in FIG. 4b, and the output of the inverter circuit $I_{23}$ becomes "0" as shown at U in the figure. If the VIR signal is not inserted in the received signal, the outputs of the inverter circuits $I_{22}$ and $I_{23}$ in the vertical flyback time undergo no change as indicated by broken lines.

A wavefrom shaping circuit 722' receives the output signal of the inverter circuit $I_{13}$. The waveform shaping circuit 722' has the same arrangement as that of the circuit 721' except that the inverter circuit $I_{21}$ is connected to the output of the NOR circuit $NR_6$.

The output signal of the inverter circuit $I_{13}$ is opposite in phase to the output signal of the inverter circuit $I_{14}$ shown at R in FIG. 4b, and rises at the time $t_{18}$ in the VIR signal receiving period.

As a result, the output signal of the waveform shaping circuit 722' becomes "0" approximately at the time $t_{18}$ as shown at S in FIG. 4b.

The output signal of the waveform shaping circuit 722' is used as the control signal of the gate circuit 722'.

In case where the VIR signal is inserted in the received signal, the output of the inverter circuit $I_{23}$ becomes "0" in the VIR signal period. The output of the waveform shaping circuit 722' becomes "0" within the period as described above, whereby the NOR circuit $NR_8$ provides "1". In case where the VIR signal is not inserted in the received signal, the NOR circuit $NR_7$ provides "1".

A latch circuit 722''' which includes the NOR circuits $NR_9$ and $NR_{10}$ is set by the output "1" of the NOR circuit $NR_8$, and is reset by the output "1" of the NOR circuit $NR_7$.

As a result, under the state under which the VIR signal is being received, the output of the inverter circuit $I_{24}$ becomes "0" as shown at V in FIG. 4b, and the output of the inverter $I_{25}$ becomes "1" as shown at W in the figure. In the case where the VIR signal is not inserted in the received signal, they become as indicated by broken lines at V and W in FIG. 4b.

The output of the inverter circuit $I_{24}$ is supplied to the circuit 715 (FIG. 2) through a line $l_{21}$. On the basis of the output of the inverter circuit $I_{25}$, the on/off of a transistor $Q_{68}$ is controlled through the transistor $Q_{67}$, and a light emitting diode LED is driven. The light emitting diode LED is lit up during the reception of the VIR signal.

When put into the "on" state, a switch SW which is connected between the terminal $P_4$ and an earth point of the circuit cuts off the composite video signal to enter the terminal $P_4$ and therefore stops the operation of the VIR signal detector circuit.

In this embodiment, the VIR signal detector circuit responds not only to the composite video signal of the so-called negative polarity in which the synchronizing signal presents the negative potential and the video signal as well as the VIR signal presents the positive potential with respect to the reference level as stated before, but also to a composite video signal of the opposite or positive polarity.

A level detector circuit 719 in FIG. 3 is installed on the idle terminal $P_3$ of the IC. It operates in the opposite phase to the phase of the circuit 718. Moreover, since it uses a p-n-p transistor $Q_{65}$, it produces the same output signal as that of the circuit 718 in response to the video signal of the positive polarity. Although the transistors $Q_{62}$ and $Q_{67}$ of the respective circuits 718 and 719 are controlled in parallel, they are in the "off" state when the corresponding circuits 718 and 719 are not used, and hence, they have no influence on the operations of the circuits 718 and 719.

In this embodiment, as stated above, the hue level detector circuits (708, 712–714) and chroma level detector circuits (706, 708–709) which exploit the VIR signal and the circuits which serve to control these circuits are constructed within the single IC.

It is not impossible to construct the logical circuit for the control circuit by the use of any circuit other than the IIL circuit in the embodiment. However, in case where it is intended to construct the logical circuit with e.g. TTL (transistor transistor logic), it must be considered that the TTL exhibits a much higher power dissipation characteristic as compared with the IIL. In such a case, it is substantially difficult to construct the circuitry within one IC package of limited size. The circuitry is consequently divided and arranged in at least two IC packages, which inevitably increases the number of interconnections outside the IC.

The construction in which the circuits concerned with one another are formed within the single IC package as in the foregoing embodiment becomes possible for the first time by constructing the logical circuits with the IIL.

In FIGS. 2 and 3, resistors $R_8$, $R_9$, $R_{20}$, $R_{42}$, $R_{36}$, $R_{57}$, $R_{63}$, $R_{67}$, $R_{80}$, $R_{82}$, $R_{72}$, $R_{87}$, etc. which are inserted in the base or collector—emitter paths of the transistors associated with the external terminals of the IC limit abnormal currents from the external terminals to the transistors within the IC as are ascribable to static charges in any state of handling of the IC, etc., and they protect the transistors from degradation in the characteristics, breakdown, etc. The resistances of these resistors are set at e.g. several tens Ω lest they should limit the normal operations of the circuits.

The embodiment above described can be modified variously.

A circuit in FIG. 8 is shown as a circuit which replaces the circuits 703 to 705. In the illustrated circuit, transistors $Q_4'$ and $Q_5'$ are connected in a parallel inverse relationship to transistors $Q_4$ and $Q_5$ respectively. A transistor of saturation operation $Q_7'$ is connected with the base of a transistor $Q_7$. As described before, the potentials of the lines $l_9$ and $l_{10}$ are fixed by the saturated operations of the transistors $Q_4$ and $Q_5$ during the period of the forcible potential setting. The potentials of the lines $l_9$ and $l_{10}$ at this time are lower than the output potential $V_{R1}$ of the first reference power supply circuit by the saturation voltages of the transistors $Q_4$ and $Q_5$. Therefore, some potential difference arises between the line $l_9$ or $l_{10}$ and the emitter potential of the transistor $Q_7$. The transistor of the saturation operation $Q_7'$ functions so as to compensate for such potential differences.

Similarly to the other transistors, the transistors $Q_4$ and $Q_5$ are fabricated within the IC in such a way that a base region is formed in the surface of a collector region which is epitaxially grown on a semiconductor substrate and which is isolated by a p-n junction and that an emitter region is formed in the base region. In this case, the emitter region is made higher in the impurity concentration than the other regions for characteristics such as current gain. Therefore, in case of operating the transistors $Q_4$ and $Q_5$ with their collectors and emitters replaced, the same operating characteristics are not exhibited.

Since currents are supplied from the lines $l_9$ and $l_{10}$ to the bases of the transistors $Q_8$ and $Q_{31}$ in FIG. 1, currents are usually supplied from the transistors $Q_4$ and $Q_5$ to the lines $l_9$ and $l_{10}$ during the period of the forcible potential setting. However, the potentials of the lines $l_9$ and $l_{10}$ sometimes become high during the potential setting period in response to the variation of the level of the corrected color difference signal. In this case, currents flow from the lines $l_9$ and $l_{10}$ to the transistors $Q_4$ and $Q_5$. As to such bidirectional currents, the transistors $Q_4'$ and $Q_5'$ are inserted in order to bestow symmetric electric characteristics between the lines $l_9$ and $l_{10}$ and the power supply $V_{R1}$.

Figure 10:
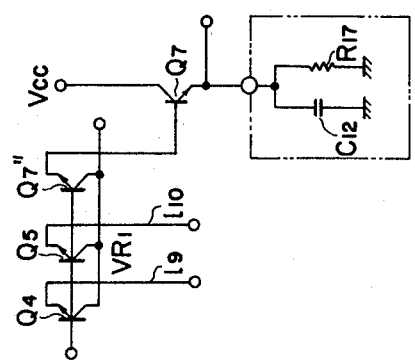

A circuit in FIG. 10 uses a transistor $Q_7''$ which is switched and controlled simultaneously with the transistors $Q_4$ and $Q_5$, instead of the transistor of the saturation operation $Q_7'$ in FIG. 8. In this circuit, a potential is held by a capacitor $C_{12}$ which is connected anew to the emitter of the transistor $Q_7$.

FIG. 9 shows an example of a variable composer circuit which is to replace the fixed composer circuit made up of the resistors $R_1$ and $R_2$ in FIG. 2 and for obtaining the corrected red color difference signal, and in which a variable resistor $R_1'$ is incorporated so as to obtain a more desirable signal.

This invention can be performed in other aspects.

For example, two sampling circuits which receive the corrected blue color difference signal in common and holding circuits which belong to the respective sampling circuits are disposed. One of the sampling circuits is operated during the reception of the VIR signal, while the other sampling circuit is operated when the VIR signal is presenting the reference black level. As a result, a potential difference which corresponds to the level of the corrected blue color difference signal during the reception of the VIR signal arises between the two holding circuits. This potential difference is derived as a chroma control signal through a differential amplifier circuit.

Likewise, two sampling circuits receiving the corrected red color difference signal, two holding circuits belonging thereto and a differential amplifier circuit are used, and a hue control signal is obtained from the differential amplifier circuit by controlling the two sampling circuits.

Figure 11:
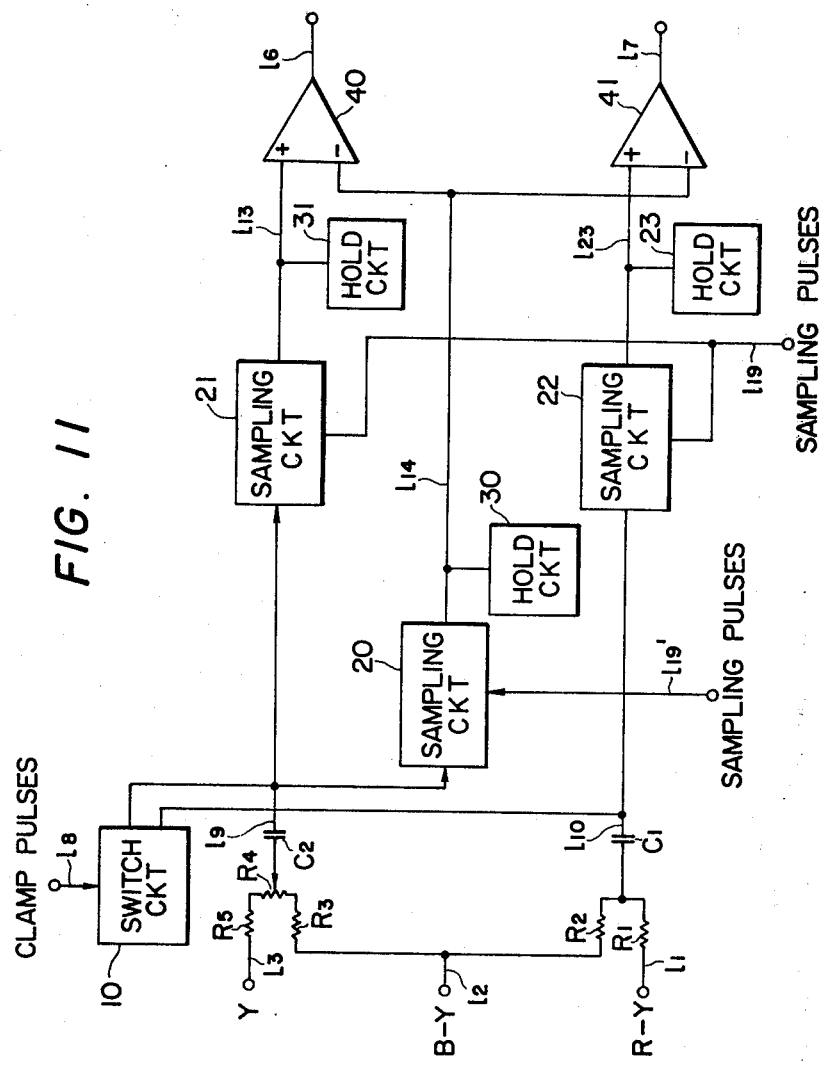

FIG. 11 shows blocks of the VIR circuit of still another embodiment.

As in the foregoing embodiment, a line $l_9$ in the figure is fed with the corrected blue color difference signal through a capacitor $C_2$ of sufficiently large capacity, while a line $l_{10}$ is fed with the red color difference signal through a capacitor $C_1$ also having a sufficiently large capacity.

A switching circuit 10 is controlled by synchronizing pulses as in the previous embodiment synchronous with horizontal synchronizing pulses received at a line $l_8$, and it forcibly sets the potentials of the lines $l_9$ and $l_{10}$ in the periods of the first-mentioned pulses.

Sampling pulses which are generated only immediately before the VIR signals are supplied to the VIR signals are supplied to a control line $l_{19'}$ of a sampling circuit 20. The sampling pulses are made pulses synchronous with the horizontal synchronizing pulses though not especially restricted. Such pulses can be formed by circuits which resemble the logical circuits in the previous embodiment.

As a result, the sampling circuit 20 samples the reference level of the corrected blue color difference signal on the line $l_9$ at the time immediately before the VIR signal is received. The sampling signal is held in a holding circuit 30.

The same sampling pulses as in the foregoing embodiment synchronous with the VIR signals are impressed on a control line $l_{19}$ which is common to sampling circuits 21 and 22.

As a result, the level of the corrected blue color difference signal at the reception of the VIR signal is held in a holding circuit 31, while the level of the corrected red color difference signal at the same time is held in a holding circuit 23.

A differential amplifier circuit 40 which receives outputs from the respective holding circuits provides an output signal corresponding to the level of the corrected blue color difference signal, while a differential amplifier circuit 41 provides an output signal corresponding to the corrected red color difference signal. The output of the differential amplifier circuit 40 is utilized as a chroma control signal, while the output of the differential amplifier circuit 41 is utilized as a hue control signal.

The VIR circuit of the embodiment in FIG. 11 is not of the construction wherein the reference level is given from one common reference power supply circuit (704) to the differential amplifier circuits (709, 714) as in the foregoing embodiment, but of the construction wherein the reference level is given directly from the line $l_9$. Therefore, the reference level to be supplied to the differential amplifier circuits does not involve any error ascribable to the saturation voltage of the transistor.

Since, in the embodiment of FIG. 11, the common sampling circuit 20 and holding circuit 30 are used for the two differential amplifier circuits 40 and 41, the number of circuit elements decreases.

In the foregoing embodiment, the corrected blue color difference signal varies only in the negative potential direction from its reference level at the reception of the VIR signal as illustrated at E in FIG. 5. In case where the sampling circuit 20 employs n-p-n transistors as in FIG. 2, it samples only the high level of the input signal in the sampling period. Accordingly, the period of generation of the sampling control signal for the line $l_{19'}$ of the sampling circuit 20 is not limited to the period immediately before the reception of the VIR signal, but it may change or fluctuate to a period immediately after the reception of the VIR signal.

What is claimed is:

1. A color signal reproducing system comprising:
    a color demodulator circuit which receives a chroma signal and a color subcarrier signal and which delivers a red color difference signal and a blue color difference signal,
    a driver circuit which receives a luminance signal and the color difference signals and which drives a picture tube,
    a composer circuit which receives the red color difference signal and the blue color difference signal and which delivers the red color difference signal corrected by the blue color difference signal,
    a circuit which delivers a reference potential corresponding to a reference level of the received chroma signal,
    a detector circuit which generates a detection signal corresponding to a level difference between the reference potential and the corrected red color difference signal at a time when a VIR signal has been received, and
    a hue control circuit which controls a phase of the subcarrier signal to be supplied to said color demodulator circuit, by the output signal of said detector circuit.

2. A color signal reproducing system according to claim 1, wherein said composer circuit includes means for making a quantity of the correction variable.

3. A color signal reproducing system comprising:
a color demodulator circuit which receives a chroma signal and a color subcarrier signal and which delivers a red color difference signal and a blue color difference signal,
a driver circuit which receives a luminance signal and the color difference signals and which drives a picture tube,
a composer circuit which combines the luminance signal and the blue color difference signal,
a detector circuit which generates a detection signal corresponding to a level of the composite output signal at a time when a VIR signal has been received, and
a chroma signal gain control circuit which is controlled by the output signal of said detector circuit.

4. A color signal reproducing system according to claim 3, wherein said composer circuit includes means for making a combining ratio of the two input signals variable.

5. A color signal reproducing system according to claim 3, wherein the luminance signal is supplied to said composer circuit through level varying means.

6. A color signal reproducing circuit comprising:
a color demodulator circuit which receives a chroma signal and a color subcarrier signal and which delivers a red color difference signal and a blue color difference signal,
a correction circuit which receives a correction signal and at least one of the output signals of said color demodulator circuit and which delivers the corrected color difference signal,
a detector circuit which generates a detection signal corresponding to a level of the corrected color difference signal at a time when a VIR signal has been received, and
a control circuit which controls at least one of a level of the chroma signal to be supplied to said color demodulator circuit and a phase of the color subcarrier signal, by the detection signal of said detector circuit,
said detector circuit being constructured of a differential amplifier circuit having a pair of differential input terminals, one of which is coupled with an output terminal of said correction circuit through an A.C. coupling capacitor and also with a first reference potential source through switching means adapted to turn "on" in a period in which the VIR signal is not received, and the other of which is coupled with a second reference potential terminal.

7. A color signal reproducing circuit according to claim 6, wherein said switching means is turned "on" in synchronism with a synchronizing signal.

8. A color signal reproducing circuit according to claim 6, wherein said color signal reproducing circuit includes a counter circuit which receives a horizontal synchronizing signal as a trigger input and which delivers a signal indicative of the time of generation of the VIR signal, at least said counter circuit and said switching means are constructed of a single semiconductor integrated circuit device, and said switching means is controlled on the basis of the trigger input signal of said counter circuit.

9. A color signal reproducing circuit according to claim 6, wherein the first and second reference potential sources are made common, and said switching means is constructed of a bipolar transistor which effects a saturation operation in the "on" state.

10. A color signal reproducing circuit according to claim 9, wherein a bias from the common reference potential source is given to the other differential input terminal through a bipolar transistor of saturation operation.

11. A color signal reproducing circuit according to claim 10, wherein said bipolar transistor is subjected to a switching control as second switching means.

12. A color signal reproducing circuit according to claim 9, wherein second switching means is connected between the one differential input terminal and a juncture of said A. C. coupling capacitor and the first-mentioned switching means, third switching means is connected between said second reference potential source and the other differential input terminal, potential holding means are respectively connected to said differential input terminals, the level of the color difference signal from said correction circuit is sampled and held in said potential holding means of said one differential input terminal under control of said second switching means when the VIR signal has been received, and a potential from said second reference potential source is sampled and held in said potential holding means of said other differential input terminal under control of said third switching means.

13. A color signal reproducing circuit according to claim 9, wherein said switching means is made up of first and second bipolar transistors of an identical conductivity type, bases of these transistors are connected in common and receive a control signal, and a collector and an emitter of said first transistor are respectively connected to an emitter and a collector of said second transistor.

14. A color signal reproducing circuit according to claim 6, wherein second switching means is connected between the one differential input terminal and a juncture of said A. C. coupling capacitor and the first-mentioned switching means, third switching means is connected between said second reference potential source and the other differential input terminal, potential holding means are respectively connected to said differential input terminals, and the color difference signal level from said correction circuit and a level of the second reference potential source are respectively sampled and held in said potential holding means under simultaneous control of said second and third switching means at the time when the VIR signal has been received.

15. A color signal reproducing circuit comprising:
a color demodulator circuit which receives a chroma signal and a color subcarrier signal and which delivers a red color difference signal and a blue color difference signal,
a correction circuit which receives a correction signal and at least one of the output signals of said color demodulator circuit and which delivers the corrected color difference signal,
a detector circuit which generates a detection signal corresponding to a level of the corrected color difference signal at a time when a VIR signal has been received, and
a control circuit which controls at least one of a level of the chroma signal to be supplied to said color demodulator circuit and a phase of the color subcarrier signal, by the detection signal of said detector circuit, said detector circuit being constructed of a differential amplifier circuit having a pair of differential input terminals, one of which receives the corrected color difference signal through first switching means including a unidirectional element that is subjected to a switching control when the VIR signal has been received, the other of which receives the blue color difference signal or the corrected blue color difference signal through second switching means including a unidirectional element that is subjected to a switching control when the chroma signal is at a reference level, and to which potential holding means for sampling and holding the signals supplied through said switching means are respectively connected.

16. A color signal reproducing circuit according to claim 15, wherein said correction circuit is made up of a first correction circuit which receives a luminance signal and the blue color difference signal and which delivers the blue color difference signal corrected by the luminance signal, and a second correction circuit which receives the blue color difference signal and the red color difference signal and which delivers the red color difference signal corrected by the blue color difference signal; said detector circuit is made up of first and second differential amplifier circuits which receive the corrected blue color difference signal and the corrected red color difference at one-side differential input terminals through switching means, respectively; and the other-side differential input terminals of said first and second differential amplifier circuits are connected in common and receive the reference level of the chroma signal through the second switching means.

17. A color signal reproducing circuit comprising:
a color demodulator circuit which receives a chroma signal and a color subcarrier signal and which delivers a red color difference signal and a blue color difference signal,
a correction circuit which receives a luminance signal and the blue color difference signal and delivers the blue color difference signal corrected by the luminance signal and which receives the blue color difference signal and the red color difference signal and delivers the red color difference signal corrected by the blue color difference signal,
a detector circuit which is made up of a first differential amplifier circuit that detects a level of the corrected red color difference signal at a time when a VIR signal has been received, to provide a first output; a second differential amplifier circuit that detects a level of the corrected blue color difference signal at the time when the VIR signal has been received, to provide a second output; and a reference potential source that is common to said first and second differential amplifier circuits,
a first control circuit which receives said first output as a control signal and which controls a level of the chroma signal to be supplied to said color demodulator circuit, and
a second control circuit which receives said second output as a control signal and which controls a phase of the color subcarrier signal to be supplied to said color demodulator circuit.

18. A color signal reproducing circuit comprising:
a color demodulator circuit which receives a chroma signal and a color subcarrier signal and which delivers a red color difference signal and a blue color difference signal,
a correction circuit which receives a correction signal and at least one of the output signals of said color demodulator circuit and which delivers the corrected color difference signal,
a detector circuit which generates a detection signal corresponding to a level of the corrected color difference signal at a time when a VIR signal has been received, and
a control circuit which controls at least one of a level of the chroma signal to be supplied to said color demodulator circuit and a phase of the color subcarrier signal, by the detection signal of said detector circuit,
a reference potential of said detector circuit at the reception of the VIR signal being obtained from the color difference signal in a pedestal period other than a horizontal synchronizing period including the VIR signal.

19. A color signal reproducing circuit comprising:
a color demodulator circuit which receives a chroma signal and a color subcarrier signal and which delivers a red color difference signal and a blue color difference signal,
a correction circuit which receives a correction signal and at least one of the output signals of said color demodulator circuit and which delivers the corrected color difference signal,
a detector circuit which generates a detection signal corresponding to a level of the corrected color difference signal at a time when a VIR signal has been received, and
a control circuit which controls at least one of a level of the chroma signal to be supplied to said color demodulator circuit and a phase of the color subcarrier signal, by the detection signal of said detector circuit,
said detector circuit being constructed of a voltage differential amplifier circuit which has a pair of differential input terminals and which receives the corrected color difference signal at one of said differential input terminals and a reference potential at the other differential input terminal.

20. A color signal reproducing circuit according to claim 19, wherein said voltage differential amplifier circuit receives the corrected color difference signal and the reference potential at the respective differential input terminals through signal holding circuits, and an offset voltage is given between said differential input terminals by making holding time constants of said signal holding circuits of the respective input terminals different.

21. A color signal reproducing circuit comprising:
a color demodulator circuit which receives a chroma signal and a color subcarrier signal and which delivers a red color difference signal and a blue color difference signal,
a correction circuit which receives a correction signal and at least one of the output signals of said color demodulator circuit and which delivers the corrected color difference signal,
a detector circuit which generates a detection signal corresponding to a level of the corrected color difference signal at a time when a VIR signal has been received,
a control circuit which controls at least one of a level of the chroma signal to be supplied to said color demodulator circuit and a phase of the color subcarrier signal, by the detection signal of said detector circuit, a VIR signal detector circuit which detects the VIR signal included in a broadcast and received signal, and a switching circuit which is controlled by said VIR signal detector circuit, an input signal to said control circuit being cut off by said switching circuit when the VIR signal is not received.

22. A color signal reproducing circuit according to claim 6, 18 or 21 wherein said correction circuit receives the blue color difference signal and the red color difference signal and which delivers the red color difference signal corrected by the blue color difference signal.

23. A color signal reproducing circuit according to claim 6, 18 or 21 wherein said correction circuit receives a luminance signal and the blue color difference signal and which delivers the blue color difference signal corrected by the luminance signal.

24. A color signal reproducing circuit comprising a current level output circuit which delivers a current corresponding to a level difference between a reference potential and a color difference signal in response to a VIR signal, and an input circuit including an impedance means which receives the output signal of said output circuit, whereby the output signal of said output circuit is converted into a voltage signal by the input impedance means of said input circuit. wherein said current level output circuit includes a current discharging transistor and a current absorbing transistor which are connected to an output terminal, said input circuit is constructed of a differential amplifier circuit which has a pair of differential input terminals, and said impedance means is connected between said differential input terminals.

25. A color signal reproducing circuit as set forth in claim 24 wherein said impedance means comprises a resistor.

26. A color signal reproducing circuit comprising a first input circuit whose input terminal is connected to a first input terminal; a second input circuit whose input terminal is connected to a second input terminal, whose output terminal is connected to an output terminal of said first input circuit in common and which operates in a phase opposite to that of said first input circuit in response to an input signal; and a VIR signal detector circuit which receives a luminance signal from the output terminals connected in common and which detects a VIR signal of a broadcast and received signal; said first and second input circuits and said VIR signal detector circuit being constructed as a single semiconductor integrated circuit device; said first and second input terminals being made external terminals of said semiconductor integrated circuit device, the luminance signal being supplied to said first or second input terminal.

27. A color signal reproducing circuit comprising a counter circuit which receives a horizontal synchronizing signal and a vertical synchronizing signal and which generates an output pulse signal in response to a VIR signal, a waveform shaping circuit which receives the output pulse signal of said counter circuit and which generates an output pulse signal at a time in the chrominance period of the VIR signal, and a detector circuit which is controlled by said waveform shaping circuit and which detects a level of an input color difference signal under reception of the VIR signal, said counter circuit being constructed of III (integrated injection logic), said detector circuit being constructed of bipolar transistor elements, said circuits being constructed in the form of a single semiconductor integrated circuit device.

28. A color signal reproducing circuit comprising a logical circuit which receives a synchronizing signal and which generates an output pulse signal at a time of generation of a VIR signal, a waveform shaping circuit which receives the output pulse signal of said logical circuit and which generates an output pulse signal at a time in the chrominance period of the VIR signal, and a detector circuit which is controlled by said waveform shaping circuit and which detects a level of an input color difference signal under reception of the VIR signal, said circuits being constructed in the form of a single semiconductor integrated circuit device, said logical circuit being constructed of IIL (integrated injection logic), said waveform shaping circuit including an input bipolar transistor serving as a switching element controlled by the output pulse signal of said waveform shaping circuit applied to the base thereof, a differential amplifier circuit receiving a collector potential of said input bipolar transistor and a reference potential at a pair of input terminals thereof, and a capacitor being arranged outside said semiconductor integrated circuit device and being coupled with the collector of said input bipolar transistor through an external terminal of said semiconductor integrated circuit device, said detector circuit being constructed of bipolar transistor elements.

* * * * *